United States Patent
Stakutis et al.

(10) Patent No.: US 6,763,423 B2
(45) Date of Patent: Jul. 13, 2004

(54) STORAGE AREA NETWORK METHODS AND APPARATUS FOR LOGICAL-TO-PHYSICAL BLOCK ADDRESS MAPPING

(75) Inventors: Christopher J. Stakutis, Concord, MA (US); Christopher Whalley, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 09/998,920

(22) Filed: Nov. 30, 2001

(65) Prior Publication Data

US 2003/0105936 A1 Jun. 5, 2003

(51) Int. Cl.$^7$ ............................................... G06F 12/00
(52) U.S. Cl. ........................... 711/5; 711/148; 717/139; 717/146; 709/245; 709/319; 709/325; 709/328
(58) Field of Search ........................... 707/10; 709/201, 709/202, 203, 217, 220, 245, 311, 312, 319, 320, 321, 324, 325, 328, 329; 710/3, 4, 8, 9, 11, 33, 72, 74; 711/1, 2, 4, 5, 111, 113, 114, 147, 148, 151; 717/136, 1, 146, 147, 153

(56) References Cited

U.S. PATENT DOCUMENTS

| | | | |
|---|---|---|---|
| 5,043,876 A | | 8/1991 | Terry |
| 5,435,004 A | | 7/1995 | Cox et al. |
| 5,457,797 A | * | 10/1995 | Butterworth et al. ........ 709/320 |
| 5,546,557 A | | 8/1996 | Allen et al. |
| 5,961,582 A | * | 10/1999 | Gaines ........................... 709/1 |
| 5,978,336 A | | 11/1999 | Mine et al. |
| 6,141,681 A | * | 10/2000 | Kyle ........................... 709/206 |
| 6,160,778 A | | 12/2000 | Ito et al. |
| 6,205,578 B1 | * | 3/2001 | Grove ........................ 717/118 |
| 6,208,345 B1 | * | 3/2001 | Sheard et al. ................ 345/853 |
| 6,233,731 B1 | * | 5/2001 | Bond et al. .................. 717/138 |
| 6,256,784 B1 | * | 7/2001 | Grove ........................ 717/139 |
| 6,282,698 B1 | * | 8/2001 | Baker et al. ................. 717/118 |
| 6,526,570 B1 | * | 2/2003 | Click et al. .................. 717/146 |
| 6,529,909 B1 | * | 3/2003 | Bowman-Amuah .......... 707/10 |
| 2002/0083216 A1 | * | 6/2002 | Hickson et al. ............. 709/319 |

OTHER PUBLICATIONS

Ross, Bill and Julian Richards, "Volume Management by the Book: The NAStore Volume Manager," *Digest of Papers* Eleventh IEEE Symposium on Mass Storage Systems (Monterey, CA: Oct. 7–10, 1991) pp. 95–99.

Lehey, Greg, "The Vinum Volume Manager," *USENIX* (Monetery, CA: 1999) (no page nos.).

\* cited by examiner

*Primary Examiner*—Donald Sparks
*Assistant Examiner*—Christian P. Chace
(74) *Attorney, Agent, or Firm*—Janaki K. Davda; Konrad, Raynes & Victor, LLP

(57) ABSTRACT

The invention provides an improved digital data processing system, e.g., storage area network (SAN), of the type having a first digital data processor, e.g., a SAN server, and a second digital data processor, e.g., a SAN client, coupled to one another and to one or more storage units, e.g., disk drives. A volume is stored on one or more of the storage devices, with at least two of its blocks residing at locations that are not contiguous with one another. The improvement is characterized, according to aspects of the invention, by transmission from the first to the second digital data processor of one or more addresses. These can constitute, in total, fewer such addresses than would be provided in a canonical map of the volume and, indeed, can comprise (by way of non-limiting example) a start address for each file and/or a portion of the volume on each storage device where the volume resides. The improvement is further characterized by an interpreter on the second digital data processor that interprets intermediate code (e.g., p-code) or other software to determine physical locations of the blocks that comprise the volume and/or file as a function of the addresses received from the first digital data processor. That software, according to aspects of the invention, embodies a methodology for determining the physical block addresses of a volume and/or file, e.g., from the volume start address (es). It can, according to further aspects of the invention, be transmitted by the first digital data processor to the second digital data processor, though it can be sourced from elsewhere, as well.

21 Claims, 3 Drawing Sheets

STORAGE AREA NETWORK METHODS AND APPARATUS FOR LOGICAL-TO-PHYSICAL BLOCK ADDRESS MAPPING

BACKGROUND OF THE INVENTION

The invention pertains to digital data processing and, more particularly, to methods and apparatus for file access. The invention has application, for example, in facilitating access by networked digital data processors to shared disk drives, disk arrays and other storage devices.

In early computer systems, long-term data storage was typically provided by dedicated storage devices, such as tape and disk drives, connected to a data central computer. Requests to read and write data generated by applications programs were processed by special-purpose input/output routines resident in the computer operating system. With the advent of "time sharing" and other early multiprocessing techniques, multiple users could simultaneously store access data—albeit only through the central storage devices.

With the rise of the personal computer (and workstation) in the 1980's, demand by business users led to development of interconnection mechanisms that permitted otherwise independent computers to access data on one another's storage devices. Though computer networks had been known prior to this, they typically permitted only communications, not storage sharing.

The prevalent business network that has emerged is the local area network, typically comprising "client" computers (e.g., individual PCs or workstations) connected by a network to a "serve" computer. Unlike the early computing systems in which all processing and storage occurred on a central computer, client computers usually have adequate processor and storage capacity to execute many user applications. However, they often rely on the server—and its associated battery of disk drives and storage devices—for other than short-term file storage and for access to shared application and data files.

An information explosion, partially brought by the rise of the corporate computing and, partially, by the Internet, is spurring further change. Less common are individual servers that reside as independent hubs of storage activity. Often many storage devices are placed on a network or switching fabric that can be accessed by several servers (such as file servers and web servers) which, in turn, service respective groups of clients. Sometimes even individual PCs or workstations are enabled for direct access of the storage devices on these so-called "storage area networks" or SANs.

Supporting an ever growing variety of client and server platforms has proven vexing to designers of storage area networks. One problem is that of providing client support for the myriad of existing and emerging server volume managers. These are modules, typically, executing in software at the operating system level, that translate or map between logical addresses used, e.g., by the file system, and physical addresses on the storage devices. A volume manager can be used, for example, to divide a single storage device (e.g., a disk drive) into multiple logical drives or partitions. Likewise, it permits multiple physical drives to be treated as one large logical drive. One popular application of volume management is for RAID storage, which improves data access by interleaving or "striping" data from one or more logical volumes across one or more physical drives, and which improves data integrity "mirroring" data written to one logical volume onto multiple physical volumes (or multiple physical areas within one volume).

Typically, volumes created by one platform cannot be interpreted by another platform. Thus, some makers limit SANs to only a single platform, insuring that clients and servers will have the same volume managers and, thereby, that the clients can properly access volumes created by the server. Another solution is to "port" the server platform volume manager to each client platform—put another way, to provide, for each server platform supported by a SAN, variants of the volume manager software capable of executing on each of the potential client platforms. While the latter is desirable from a customer perspective, it places an enormous burden on SAN makers and volume management makers alike. Though they may be competitors, companies in both camps must provide software that supports the other's products and, often, must collaborate on the details of that software. Customers may be inconvenienced, as well, having to upgrade and/or reinstall their software to accommodate newly supported platforms.

SUMMARY OF THE INVENTION

The foregoing are among the objects attained by the invention which provides, in one aspect, an improved digital data processing system, e.g., storage area network of the type having a first digital data processor, e.g., a SAN server, and a second digital data processor, e.g., a SAN client, coupled to one another and to one or more storage units, e.g., disk drives. A volume is stored on one or more of the storage devices, with at least two of its blocks residing at locations that are not contiguous with one another.

The improvement is characterized by transmission from the first to the second digital data processor of one or more addresses, each for a portion of the volume residing on each storage device. These can constitute, in total, fewer such addresses than would be provided in a canonical map of the volume and, indeed, can comprise (by way of non-limiting example) a start address for the blocks that make up a requested file or volume on each device where the volume resides.

The improvement is further characterized by an interpreter on the second digital data processor that interprets (or "executes") p-code or other intermediate code or other software (e.g., symbolic or methodological description) to determine physical locations of the blocks that comprise the volume as a function of the addresses received from the first digital data processor. That software, according to aspects of the invention, embodies a methodology for determining the physical block addresses of a volume and/or a file thereon, e.g., from the start address(es). It can, according to further aspects of the invention, be transmitted by the first digital data processor to the second digital data processor, though it can be sourced from elsewhere, as well.

Further aspects of the invention provide a storage area network as described above in which the first digital data processor operates under a first software platform and the second digital data processor operates under a second software platform that differs from the first software platform. Thus, for example, the first platform can be AIX™, while the second platform can be Windows™, Solaris™, or so forth.

Still further aspects of the invention provide a storage area network or other digital processing system as described above in which the volume is created by a volume manager executing on the first digital data processor under the first software platform. Correspondingly, the second digital data processor executes at least a limited second volume manager for at least one of recognizing and accessing the volume or file at the determined physical addresses.

Yet still further aspects of the invention provide methods of operating a digital data processing system or storage area network paralleling the operations described above.

Networks, systems and methods according to the invention have several advantages over the prior art. Among these, intermediate or other code for determining the volume or file block physical addresses can be transmitted to and/or installed on the client digital data processors independently of any other code defining the network or system. Moreover, once familiar with the environment in which the intermediate or other code will be interpreted (or executed), makers of server volume management systems can develop code for use on the clients without revealing that code to makers of the storage area networks. This can be particularly beneficial, by way of non-limiting example, where the volume management maker utilizes proprietary techniques for striping or other RAID support.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
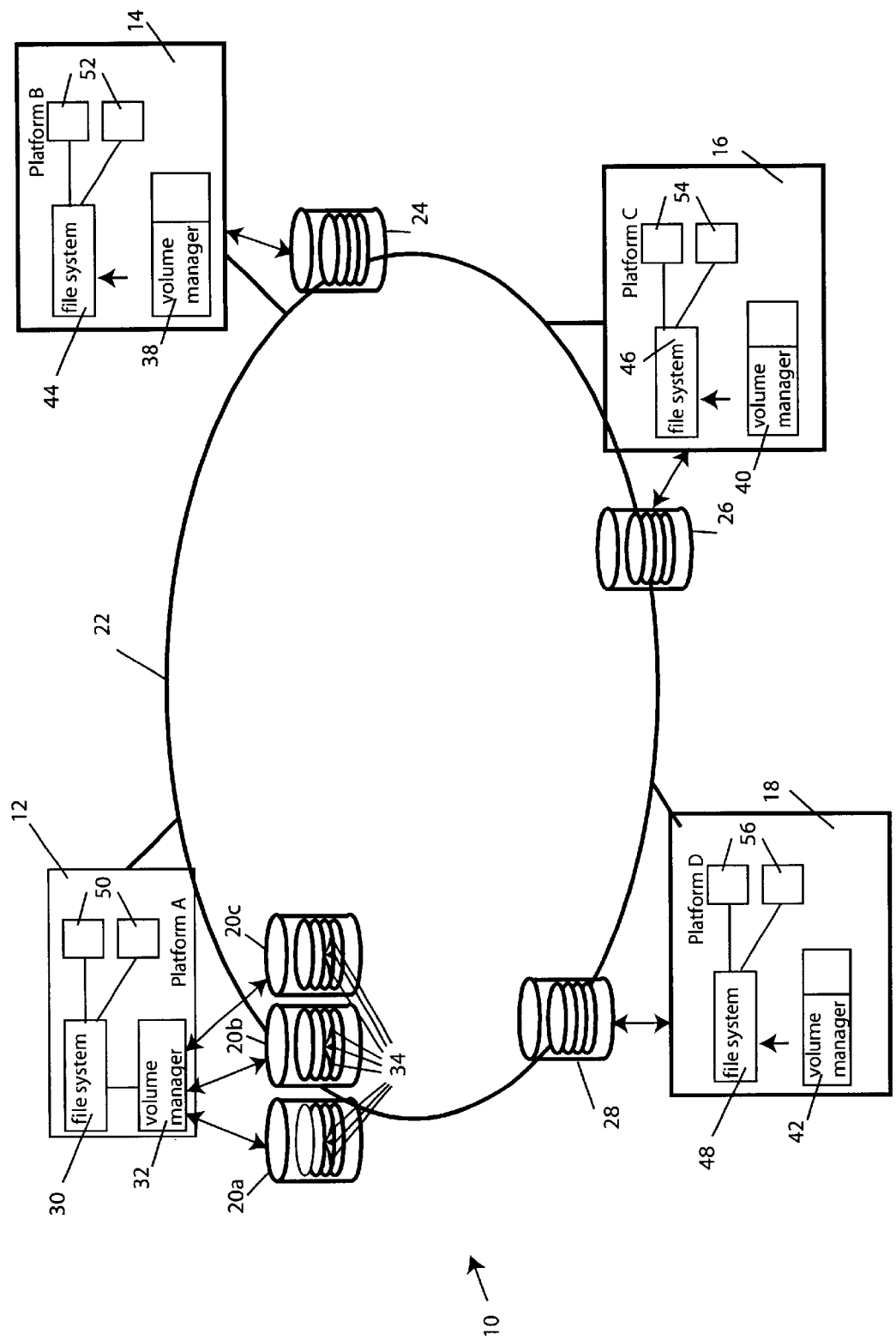
FIG. 1 depicts a storage area network or other digital data processing system according to the invention.

FIG. 1 depicts a storage area network (SAN) 10 according to the invention. The SAN 10 includes a plurality of nodes, in this case, digital data processors, 12, 14, 16, 18 of the type typically or otherwise suitable for use in a such a network. Thus, for example, in the illustrated embodiment, digital data processor 12 represents a mainframe computer, workstation, personal computer, or other digital data processing apparatus (or "node") capable of providing server functions in such networks and, particularly, of monitoring and/or controlling access to shared peripheral devices, such as disk drives 20a, 20b, 20c (collectively, "20").

Digital data processors 14–18 likewise represent workstations, personal computers, dedicated devices, or other digital data processing apparatuses (or "nodes") that generate requests for services provided by digital data processor 12 including, requests for access to peripheral devices 20a–20c. Elements 14–18 can represent individual users' personal computers or workstations, though, in a typical embodiment these "clients" often function as servers to other nodes (not shown), e.g., over LANs, WANs, MANs, the Internet, and so forth. Of course, those skilled in the art will appreciate that the invention can be practiced with multiple servers and, indeed, that one or more of the nodes 14–18 may exist in the role of a server to node 12 and/or to the other clients. For simplicity, however, in the discussion that follows digital data processor 12 is referred to as the "server", while digital data processors 14–18 are referred to as the "clients."

Digital data processors (or other nodes) 12–18 are interconnected for communication via network 22, which represents wire cable interconnects, wireless interconnects, point-to-point interconnects, Internet interconnects or other digital communications interconnects of the type known in the art. Clients 14–18 are coupled for direct or indirect (e.g., via server 12) communication with drives 20a–20c over network 22 or over further media, not shown. In addition to being coupled to drives 20a–20c, clients 14–18 may be in communication with zero, one or more further peripheral devices, representatively identified by drives 24, 26, 28.

In the illustrated embodiment, digital data processors 12–18 operate under diverse software platforms. Thus, by way of example, server 12 may operate under the AIX™ operating system, clients 14 and 16, under the Windows NT™ operating system, and client 18, under Linux™. In other embodiments, further or lesser diversity may exist as between the platforms, e.g., such that all nodes 12–18 operate under different platforms or, potentially, under the same platform. As used herein, "platform" operating system and/or other aspects of the software operating environment (particularly, for example, including volume management) that affects, e.g., the nodes' inherent ability to recognize and/or access volumes written by the other nodes.

Server 12 utilizes a file system 30 of the type known in the art to provide an interface between application programs (and operating system components) 50 and the peripheral devices, e.g., drives 20, to which it is coupled. The file system 30 accesses files on those devices via logical volume identifiers and treats each volume and file as if it were comprised of contiguous blocks, relying on volume manager 32 to provide any necessary translation or mapping from these logical identifier and block addresses to actual physical storage location addresses on the devices 20.

In the illustrated embodiment, elements 12 comprise a SAN server or meta-data controller (MDC) of the type described in copending, commonly assigned U.S. patent application Ser. No. 09/687,390, filed Oct. 13, 2000, and entitled TERM-BASED METHODS AND APPARATUS FOR ACCESS TO FILES ON SHARED STORAGE DEVICES, the teachings of which are incorporated herein by reference. In this regard, see by way of non-limiting example FIGS. 1–4 of the incorporated by reference application and the corresponding text. Of course, elements 12 may comprise other functionality instead or in addition.

Volume manager 32 is a conventional volume manager of the type conventionally known in the art that translates or maps between logical addresses used, e.g., by the file system 32, and physical addresses on the storage devices to which server 12 is coupled, e.g., disk drives 20. FIG. 1 illustrates the use of the volume manager 32 to stripe data from a logical volume 34 across the multiple physical drives 20a, 20b, 20c. In addition to striping across multiple drives, the volume manager 32 can be used to partition a single drive into one or more volumes (or partitions), to combine multiple drives into a single partition, and/or to perform other operations known in the art for a volume manager.

Though illustrated file system 30 may—like most conventional file systems—treat files as comprised of contiguous blocks and to generate logical addresses accordingly, the blocks may be contained at diverse physical address on the drives occupied by the volume. For example, a 5 Mbyte file stored in a logical volume that is contained on a single drive may be composed of several groups of, say, 8–10 blocks of 128 kbytes, each. This is true of striped volumes by definition and may be true of other types volumes, as well, depending on the storage management techniques (proprietary or otherwise) employed by the volume manager 32.

Figure 2:
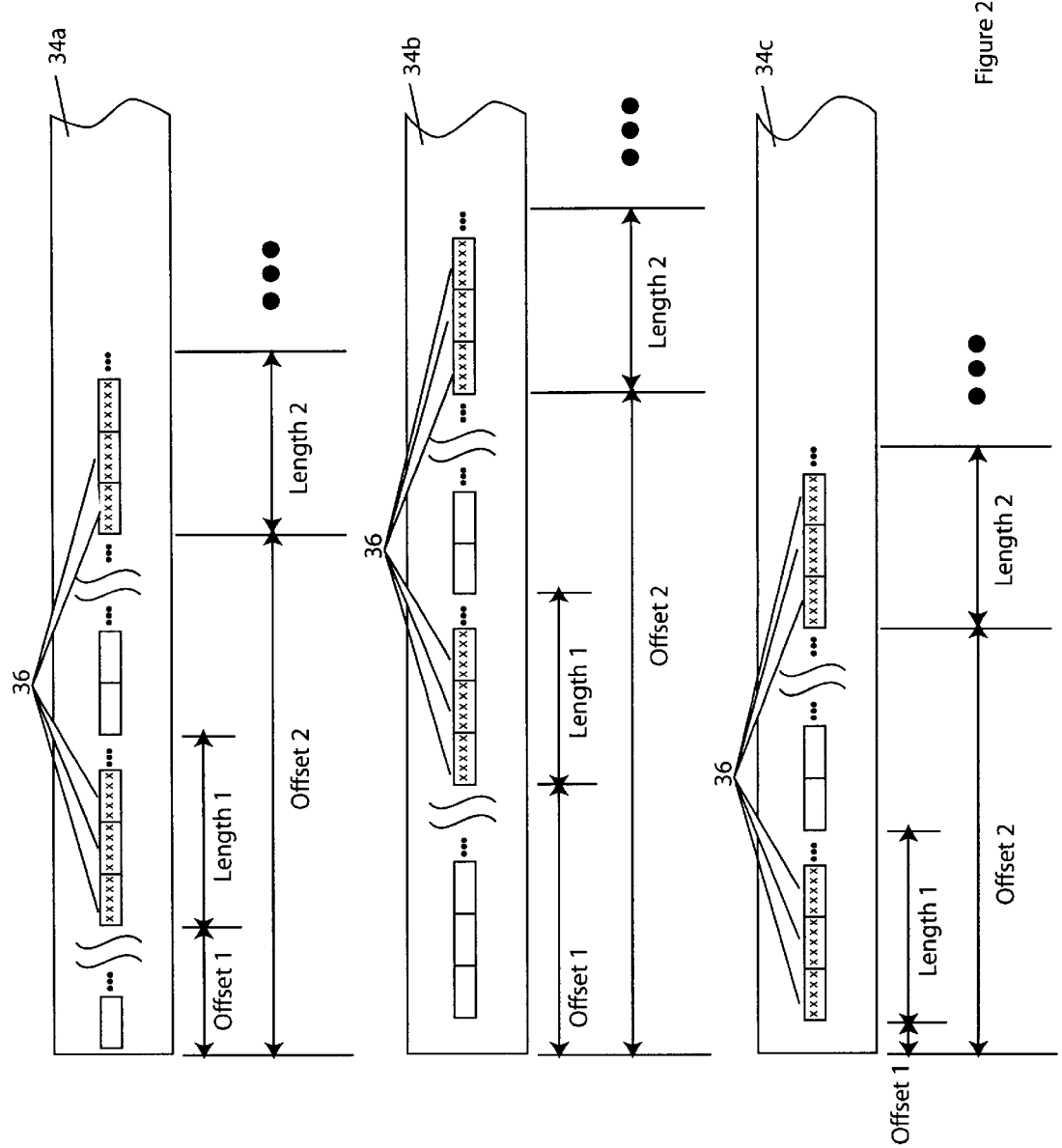
FIG. 2 depicts a block storage mechanism of the type employed by a volume manager in a digital data processing system according to the invention.

FIG. 2 depicts physical storage of blocks comprising illustrative file 36 on the portions 34a, 34b, 34c of the striped volume 34 (FIG. 1) contained on drives 20a, 20b, 20c. As indicated in the drawing, those blocks (labeled with X's) are grouped in clusters that are separated by blocks from other files (labeled without X's) and that each begin at a specified start location on each disk. Those start locations are identified in the drawing as offsets (e.g., "Offset 1" and "Offset 2"), e.g., from the start of the respective portion of the volume, though in alternate embodiment they can be identified as offsets from another location, or otherwise. Each cluster moreover is of a specified length, as so indicated in the drawings by the designators "Length 1" and "Length 2." Though a common notation is used for these offsets and lengths, it will be appreciated that they do not necessarily coincide among the drives. More particularly, Offset 1, Offset 2, Length 1 and Length 2 are not necessarily the same for drives 20a and 20b, nor for 20b and 20c, and so forth.

Just as the blocks that make up illustrative file 36 are grouped in clusters whose physical locations can be described by offsets and lengths, so too may the blocks that comprise the volume as a whole. Of course, rather than the start locations being specified as offsets from the start of the volume, they would be specified as an absolute physical address or an offset from a start of the respective drives data storage areas, or otherwise.

As noted above, the file system 30 provides an interface for application programs (and operating system components) 50 executing on server 12. Clients 14–18 include file systems 44–48, respectively, providing similar functionality for their respective application programs (and operating system components) 52–56. In the illustrated embodiment, file systems 44–48 comprise SAN client functionality as illustrated in connection with client file system shown, e.g., in FIG. 2 of aforementioned incorporated-by-reference U.S. patent application Ser. No. 09/687,390.

Volume manager 32, to reiterate, translates or maps between logical addresses used, e.g., by the file system 32, and physical addresses on the storage devices to which server 12 is coupled, e.g., disk drives 20. Referring back to FIG. 1, clients 14–18 also include volume managers 38–42, respectively, providing similar functionality with respect to their respective file systems 44–48. In the illustrated embodiment, this includes providing such translation and mapping for volumes (and their respective files) native to the respective software platforms 14–18, as well as to volumes for non-native platforms—such as those on the other illustrated digital data processors. In some embodiments of the invention, volume managers 44–48 provide only partial such functionality, e.g., not the capability to create, manage and access native platform volumes but, rather, only to recognize and access non-native platform volumes and/or files therein.

Figure 3:
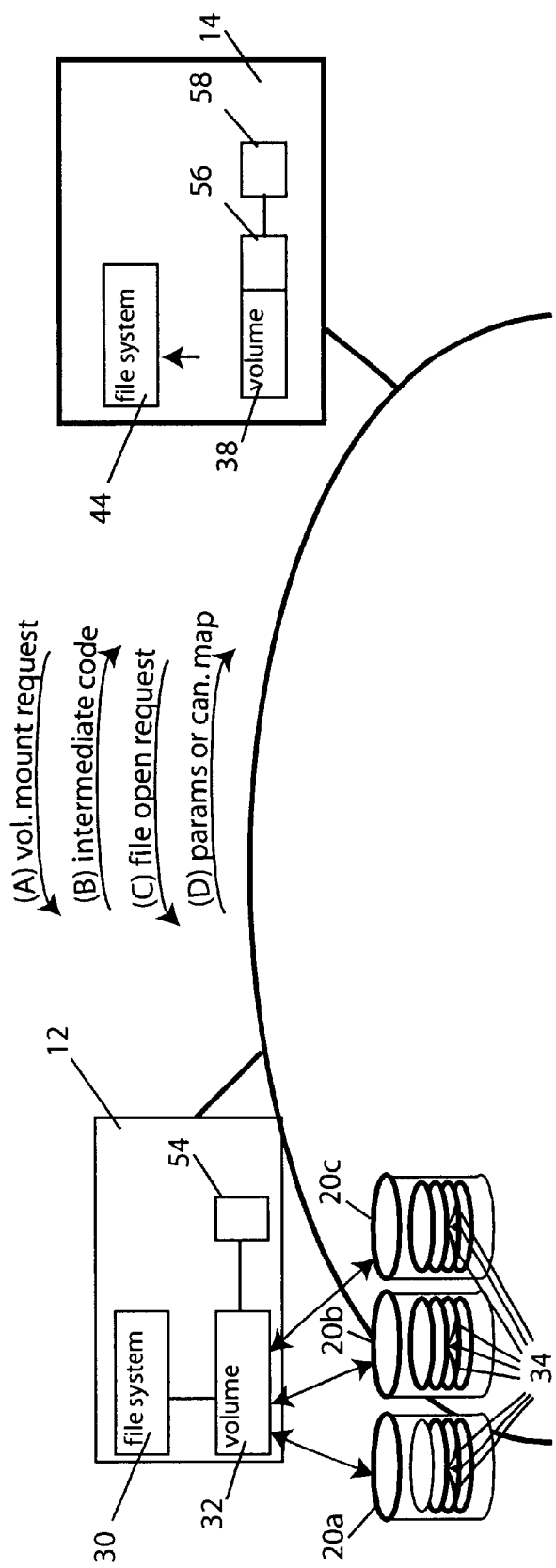
FIG. 3 depicts a block mapping mechanism in a digital data processing system according to the invention.

Volume managers 44–48 employ the functionality illustrated in FIG. 3 to facilitate at least recognition and/or access to such non-native platform volumes (in the illustrated example, volume 34 created by server 12) without requiring that each include volume management code ported from the other platforms.

Referring to that drawing (which is excerpted from FIG. 1 for convenience of illustration), software module 54 can generate and transmit to the client 14 (as well as other clients 16–18, as necessary) a canonical map identifying the physical location(s) on drives 20a–20c of portion(s) of volume 34 and, more typically, of a specified file 36 in that volume. Though such maps can be generated and transmitted for all files in the volume 34, preferably, they are supplied on an as needed basis in response to individual access requests (e.g., file open commands) issued by client 14. In embodiments where it is desirable to facilitate recognition of volume 34 as a whole, e.g., by a backup application 52 executing on client 14, a map of all blocks making up that volume can be transmitted, for example, in response to a first file open command, a mount command, or otherwise. Information supplied by module 54 is obtained from volume manager 32 to which it is coupled and/or from the drives 20a–20c on which the volume 34 resides.

Volume manager 38 stores the canonical map to table 56 for use in responding to access requests generated by its associated file system 44. Thus, as the latter generates requests for access to file 36, volume manager 38 utilizes the table to translate or map those logical addresses in those requests to physical addresses via which the requisite blocks can be obtained.

A further appreciation of the use of such a canonical map (or "block map") may be attained by reference to aforementioned incorporated-by-reference application U.S. patent application Ser. No. 09/687,390.

As an alternative to generating a canonical map, module 54 can respond to access requests by client 14 by generating a more compact description from which a block map can be created. This is particularly suitable where the requested file 36 resides in a volume 34 that is RAID striped or otherwise stored in blocks whose physical addresses can be expressed methodologically, e.g., as opposed to canonically.

To this end, in the illustrated embodiment, module 54 supplies to client 14 (as well as to clients 16, 18, as necessary) intermediate or p-code describing the physical block mapping mechanism employed on drives 20a–20c and/or with respect to a specific volume 34 thereon. Such code can be supplied on client boot-up, at the time of the client's first request for access to the drives 20a–20c, volume 34 and/or file 36, or at another suitable time. See step (A) of FIG. 3. Though in the illustrated embodiment, the code is supplied by server 12 (see step (B)), in other embodiments it can be sourced from elsewhere, e.g., the SAN maker's web site, and obtained elsewise, e.g., by way of automatic, periodic "live update" over the Internet.

Unlike prior art approaches, in which volume management code ported to the client 14 must be incorporated into the volume manager 38 at installation time, i.e., when the applications or file system components 52 are installed, intermediate or p-code transmitted to client 14 need not be installed on the client 14. Instead, it is interpreted (or "executed," as interpretation is sometimes referred) by p-code interpreter (or executer) 58 on client 14 and used to populate table 56 with codes necessary to translate logical addresses generated by file system 44 into physical addresses for volume 36 and/or file 38 thereon.

In the illustrated embodiment, the intermediate or p-code is not specific to a given file but, rather, general to the storage devices 20a–20c (or, more accurately, to the volume management mechanism employed by volume manager 32 for files stored on those devices). Accordingly, table 56 is not populated with a block mapping at the time the intermediate or p-code is received by client 14 but, rather, when parameters relevant to a specific file (or volume) are received from server 12. These parameters are generated and transmitted by module 54 on receipt of a file open command or other client 14 request for access to file 36. At that time, interpreter 58 utilizes the parameters to exercise the intermediate or p-code to populate the table for the volume manager 38.

In the illustrated embodiment, specific parameters supplied by module 54 include the offset(s) of the portion(s) of volume 34 on the disks 20a–20c and the offset of the requested file 36 within the volume 34. See steps (C) and (D). Additional volume-related information may also be supplied, such as a common identifier of the SAN "file system" of which the volume 34 is a part and a logical identifier of the drives 20a–20c that it comprises.

Though the illustrated embodiment utilizes intermediate or p-code to represent the block mapping methodology of at least certain files, those skilled in the art will appreciate that other code formats can be used instead. Examples include Java, to name one. Correspondingly, while the illustrated embodiment uses a p-code interpreter of the type supplied with the publicly available "Small" programming language to codes transmitted to the client 14, those skilled in the art will appreciate that other intermediate (or other code format) interpreters of the type known in the art can be used instead. It will be appreciated that the invention does not contemplate any specific block mapping methodology but, rather, the apparatus and methods described herein to facilitate conveyance and usage of any such methodology by a client volume manager 38, 40, 42.

To insure flexibility, module 54 is capable of supplying logical-to-physical block mapping information to client 12 using either the canonical mapping or the more compact mechanism described immediately above. In the illustrated embodiment, the latter is used for files 36 that are stored on RAID striped volumes 34, though, it can be used for other files (or volumes) whose block mapping can be suitably determined by application of supplied parameters to the intermediate, p-code or other "algorithmic" description of the block mapping mechanism. For other files, module 54 transmits the explicit canonical map. Again, see steps (C) and (D).

Described above are systems and methods meeting the desired objects. Those skilled in the art will appreciate that the illustrated embodiment is merely an example of the invention and that other embodiments incorporating modifications thereto fall within the scope of the invention. Thus, although the illustrated embodiment is described as a storage area network, it will be appreciated that the teachings herein can be utilized for a host of other application in a host of other environments. Moreover, it will be appreciated that those teachings can be applied across a variety of software platforms, in connection with a variety of volume management techniques.

In view thereof, what we claim is:

1. In a storage area network of the type having
    a fast digital data processor,
    one or more storage units, coupled to the first digital data processor, each of at least one of the storage units having thereon at least a portion of a volume, where the volume comprises a plurality of blocks, at least two of which blocks are not stored contiguously with one another,
    a second digital data processor, coupled to the first digital data processor and to the one or more storage units,
    the improvement wherein,
    the first digital data processor transmits to the second digital data processor one or more addresses, each address being for at least a portion of the volume residing on each of the respective storage units and transmits software describing a physical block mapping mechanism employed with respect to at least one of the volume and a drive on which the volume resides, and
    the second digital data processor comprising an interpreter that interprets the software to determine physical locations of the blocks that comprise the volume as a function of the one or more addresses by generating codes used to translate the addresses to the physical locations of the blocks, wherein the volume that the second digital data processor is accessing is non-native to the second digital data processor.

2. In the storage area network of claim 1, the further improvement wherein the one or more addresses are fewer in number than a number of addresses that would be provided with a canonical map of blocks that comprise the volume.

3. In the storage area network of claim 1, the further improvement wherein
    the first digital data processor operates under a first software platform, and
    the second digital data processor operates under a second software platform that differs from the first software platform.

4. In the storage area network of claim 1, the further improvement wherein the volume is at least one of created and maintained by the first digital data processor.

5. In the storage area network of claim 1, the further improvement wherein the software that is transmitted by the first digital data processor to the second digital data processor is intermediate code.

6. In the storage area network of claim 5, the further improvement wherein the intermediate code transmitted by the first digital data processor to the second digital data processor is p-code.

7. In the storage area network of claim 1, the further improvement wherein
    the first digital data processor additionally transmits to the second digital data processor one or more further addresses, each further address being for a file in the volume, wherein the one or more further addresses are fewer in number than a number of addresses that would be provided with a canonical map of blocks that comprise the file,
    the second digital data processor interpreting the software to determine physical locations of the blocks that comprise the file as a function of the one or more addresses and the one or more further addresses.

8. In the storage area network of claim 7, the further improvement wherein the one or more further addresses comprise an offset of the file within the volume.

9. A digital data processing system comprising
    a first digital data processor operating under a first software platform and executing a first volume manager,
    one or more storage units, coupled to the first digital data processor, the one or more storage units having thereon a volume that is at least one of created and maintained by the first volume manager, the volume comprising a plurality of blocks,
    a second digital data processor, coupled to the first digital data processor and to the one or more storage units, operating under a second software platform and executing at least a limited second volume manager, the second software platform differing from the first software platform,
    the first digital data processor transmits to the second digital data processor one or more addresses, each address being for at least a portion of the volume residing on each of the respective storage units and transmits software describing a physical block mapping mechanism employed with respect to at least one of the volume and a drive on which the volume resides,
    the second digital data processor interpreting the software to determine physical locations of the blocks that comprise the volume as a function of the one or more addresses by generating codes used translate the addresses to the physical locations of the blocks, wherein the volume that the second digital data processor is accessing is non-native to the second digital data processor, where that software is installed, on the second digital data processor independently of the second volume manager, the second volume manager being responsive to the physical locations so determined for at least one of recognizing and accessing the volume.

10. The digital data processing system of claim 9, wherein the first digital data processor is a server digital data processor and the second digital data processor is a client digital data processor.

11. The digital data processing system of claim 9, wherein the first digital data processor additionally transmits to the second digital data processor one or more further addresses, each further address being for a file in the volume, and the second digital data processor interprets the software to determine physical locations of the blocks that comprise the file as a function of the one or more addresses and the one or more further addresses.

12. The digital data processing system of claim 11, the further improvement wherein the one or more further addresses comprise an offset of the file within the volume.

13. The digital data processing system of claim 12, wherein the one or more further addresses are fewer in number than a number of addresses that would be provided with a canonical map of blocks that comprise the file.

14. The digital data processing system of claim 11, wherein the software transmitted by the first digital data processor to the second digital data processor is intermediate code.

15. The digital data processing system of claim 14, the further improvement wherein the intermediate code transmitted by the first digital data processor to the second digital data processor is p-code.

16. The digital data processing system of claim 11, the further improvement wherein the first digital data processor operates under a first software platform, and the second digital data processor operates under a second software platform that differs from the first software platform.

17. A method of operating a storage area network of the type having a first digital data processor, one or more storage units, coupled to the first digital data processor, each of at least one of the storage units having thereon at least a portion of a volume, where the volume comprises a plurality of blocks, at least two of which blocks are not stored contiguously with one another, a second digital data processor, coupled to the first digital data processor and to the one or more storage units, the method comprising transmitting software describing a physical block mapping mechanism employed with respect to at least one of the volume and a drive on which the volume resides to the second digital data processor, transmitting from the first digital data processor to the second digital data processor one or more addresses, each address being for the at least a portion of the volume residing on each of the respective storage units, interpreting the software on the second digital data processor to determine physical locations of the blocks that comprise the volume as a function of the one or more addresses by generating codes used to translate the addresses to the physical locations of the blocks, wherein the volume that the second digital data processor is accessing is non-native to the second digital data processor.

18. The method of claim 17, comprising transmitting from the first digital data processor to the second digital data processor one or more further addresses, each further address being for a file in the volume, and wherein the interpreting step includes interpreting the software on the second digital data processor to determine physical locations of the blocks that comprise the file as a function of the one or more addresses and the one or more further addresses.

19. The method of claim 18, comprising operating the first digital data processor under a first software platform, and operating the second digital data processor under a second software platform that differs from the first software platform.

20. The method of claim 19, comprising at least one of creating and maintaining the volume with the first digital data processor.

21. A method of digital data processing comprising operating a server digital data processor under a first software platform and executing a first volume manager thereon, creating a volume using the first volume manager on one or more storage units, the volume comprising a plurality of blocks, operating a client digital data processor under a second software platform and executing at least a limited second volume manager thereon, the second software platform differing from the first software platform, transmitting software describing a physical block mapping mechanism employed with respect to at least one of the volume and a drive on which the volume resides to the second digital data processor software independent of that which comprises the second volume manager, transmitting from the first digital data processor to the second digital data processor one or more addresses, each address being for at least a portion of the volume residing on each of the respective storage units, and interpreting the software to determine physical locations of the blocks that comprise the volume as a function of the one or more addresses by generating codes used to translate the addresses to the physical locations of the blocks, wherein the volume that the second digital data processor is accessing is non-native to the second digital data processor.

* * * * *